United States Patent [19]

Robbins et al.

[11] 4,344,863

[45] Aug. 17, 1982

[54] PROCESS FOR DEFOAMING ACID GAS SCRUBBING SOLUTIONS AND DEFOAMING SOLUTIONS

[75] Inventors: Max L. Robbins, South Orange; Edwin R. Ernst, Kendall Park, both of N.J.

[73] Assignee: Exxon Research & Engineering Co., Florham Park, N.J.

[21] Appl. No.: 105,908

[22] Filed: Dec. 21, 1979

Related U.S. Application Data

[62] Division of Ser. No. 930,915, Aug. 4, 1978, Pat. No. 4,208,385.

[51] Int. Cl.$^3$ .................................................. C09K 3/00
[52] U.S. Cl. ........................... 252/192; 252/189; 252/190; 252/358; 423/226; 423/228; 423/232
[58] Field of Search ................ 252/192, 358, DIG. 1, 252/189, 190; 423/232, 223, 226–228, 245 R; 560/198

[56] References Cited

U.S. PATENT DOCUMENTS

| | | | |
|---|---|---|---|
| 2,176,441 | 10/1939 | Ulruch et al. | 423/228 |
| 3,071,433 | 1/1963 | Dunn | 423/224 |
| 3,642,430 | 2/1972 | Benson | 423/223 |
| 3,848,057 | 11/1974 | Leder et al. | 423/223 |
| 3,862,243 | 1/1975 | Bellos | 260/615 B |
| 3,943,227 | 3/1976 | Schutze | 423/232 |
| 4,112,050 | 9/1978 | Sartori et al. | 423/223 |
| 4,112,051 | 9/1978 | Sartori et al. | 252/192 X |
| 4,112,052 | 9/1978 | Sartori et al. | 423/228 |

OTHER PUBLICATIONS

"The Wonderful World of Pluronics Polyols", BASF Wyandotte Corporation, Wyndotte, Michigan, 1972, pp. 4–7, 12 & 13.

*Primary Examiner*—Joseph L. Schofer
*Assistant Examiner*—J. L. Barr
*Attorney, Agent, or Firm*—Albert P. Halluin; Janet E. Hasak

[57] ABSTRACT

The foam in acid gas scrubbing solutions created during an acid gas scrubbing process is reduced or eliminated by the addition of certain polyoxyethylene polyoxypropylene block cpolymers as defoaming agents. The defoaming agents are particularly effective when the acid gas scrubbing solution contains an amine having a large hydrophobic moiety.

9 Claims, No Drawings

PROCESS FOR DEFOAMING ACID GAS SCRUBBING SOLUTIONS AND DEFOAMING SOLUTIONS

This is a division of application Ser. No. 930,915, filed Aug. 4, 1978 now U.S. Pat. No. 4,208,385.

BACKGROUND OF THE INVENTION

1. Field of the Invention

The present invention pertains to a process for reducing or eliminating foam in an acid gas scrubbing process stream by the addition of certain polyoxyethylene polyoxypropylene block copolymers. The present invention also includes acid gas scrubbing solutions containing these block copolymers.

2. Description of the Prior Art

Acid gas scrubbing processes are of considerable industrial importance. Most acid gas scrubbing processes involve contacting a gas stream with an aqueous alkaline solution and absorbing the acid gas, principally carbon dioxide and hydrogen sulfide, into the solution and regenerating the solution in a separate stage. The regenerated solution is then recycled to the absorption stage. One of the problems encountered in acid gas scrubbing processes is excess foaming, i.e., aqueous alkaline solutions have a natural inclination to foam, and the passing of a gas into a foamable solution is classic to the production of a foam. Consequently, resort to the use of antifoaming agents as additives to the aqueous acid gas scrubbing solutions is a common practice in the art.

There are many commercially available antifoaming agents. These antifoaming agents find a plurality of uses. However, the selection of an antifoaming agent in acid gas scrubbing processes is dependent upon several variables unique to acid gas scrubbing processes. The antifoaming agents of the present invention are particularly suited for acid gas scrubbing processes.

The following U.S. patents were considered in connection with the present invention:

| U.S. Pat. Nos. | |
| --- | --- |
| 2,176,441 | 3,848,057 |
| 2,608,462 | 3,862,243 |
| 2,674,619 | 3,943,227 |
| 2,712,978 | 4,002,721 |
| 2,946,652 | 4,042,528 |
| 3,071,433 | 4,094,957 |
| 3,275,403 | 4,100,257 |
| 3,642,430 | 4,101,633 |

None of these patents disclose, teach or suggest the use of polyoxyethylene polyoxypropylene block copolymers as anti-foaming agents in acid gas scrubbing processes. Many of these patents teach acid gas scrubbing processes and the general use of conventional antifoaming agents in their respective processes. Of particular interest are U.S. Pat. Nos. 4,094,957; 4,100,257; and 4,101,633, in addition to U.S. Pat. Nos. 4,112,050; 4,112,051; and 4,112,052, the disclosures of which are incorporated herein by reference. These patents teach and disclose the use of sterically hindered amines, alone, or in combination with other acid gas scrubbing compositions in acid gas scrubbing processes. These patents point out that there are three principal types of acid gas processes, i.e., the aqueous amine process (amine and water constitute the acid gas scrubbing solution), the "hot potash" process (an inorganic alkaline material such as potassium carbonate activated by at least one amine) and the organic solvent process (an organic solvent such as sulfolane used in combination with an amine). Foaming problems are especially troublesome in the "hot potash" type processes such as described and claimed in U.S. Pat. No. 4,094,957 and U.S. Pat. No. 4,112,050.

The prior art has included disclosures of certain block copolymers of oxyalkylene moieties as antifoamers for acid gas scrubbing processes. For example, U.S. Pat. No. 3,862,243 (in the list above) discloses polyoxyethylene polyoxybutylene block copolymers of the formula $R(OEt)_n (OBu)_m OH$ where R is an alkyl or alkenyl group having 6-22 carbon atoms, OEt is oxyethylene, OBu is oxybutylene, n is from 3 to 22 and m is from about 3 to 15. It is disclosed in this patent that these block copolymers may be used as antifoamers in alkanolamine acid gas scrubbing processes. Also, the technical brochure entitled "The Wonderful World of Pluronic Polyols", published 1973 by BASF Wyandotte Corporation, Wyandotte, Mich. 48192 discloses polyoxyethylene polyoxypropylene block copolymers as antifoamers and in particular reference is made to their use in "gas-treating units".

It has been recently discovered that high foams in aminecarbonate solutions, where the amine has a large hydrophobic moiety, do not respond adequately to conventional hydrocarbon- and silicone-based antifoaming agents when in use in acid gas scrubbing processes. Most conventional antifoaming agents work by spreading at the air/solution interface thereby disrupting the films formed by surface active materials dissolved in the solution. This mechanism has been found to be ineffective in hot aminecarbonate solutions where the amine has a large hydrophobic moiety in addition to its hydrophilic amine groups. This problem is particularly acute in the case of sterically hindered amine activators in hot carbonate solutions such as disclosed in U.S. Pat. No. 4,094,957 and U.S. Pat. No. 4,112,050.

It has now been discovered that foam-breaking of these hydrophobe-containing amine-carbonate solutions can be accomplished by lowering the hydrophile-lipophile balance (HLB) of the foam-forming surfactants (i.e., the hydrophobe-containing amines act as surfactants in the hot carbonate solutions) by the addition of a low HLB surfactant which is itself a low foamer. It has been found that one class of low HLB surfactants useful as a foam-breaker in these hydrophobic amine-carbonate solutions are the polyoxyethylene polyoxypropylene block copolymers described herein. This discovery is unexpected, since the use of these block copolymers in aqueous amine acid gas scrubbing solutions (i.e., those solutions where the amine is used as the sole absorbent) are ineffective in controlling foaming. For example, it has been shown that the addition of BASF-Wyandotte Pluronic polyol L72 to an aqueous solution of methyldiethanolamine (MDEA) or N-cyclohexyl-1,3-propanediamine (CHPD) gas treating solution caused excessive foaming.

SUMMARY OF THE INVENTION

The present invention is directed to an acid gas scrubbing solution comprising: (a) an alkaline material comprising a basic alkali metal salt or alkali metal hydroxide, (b) an activator for said alkaline material comprising at least one amine having a hydrophobic moiety, and (c) water, the improvement comprising the addition of a defoaming amount of an antifoaming agent comprising polyoxyethylene polyoxypropylene block copolymers of the general formula:

$$HO(C_2H_4O)_a(C_3H_6O)_b(C_2H_4O)_cH$$

wherein a and c are integers such that the hydrophile portion represented by ($C_2H_4O$) constitutes from about 10 to about 30, and preferably from about 15 to about 25 weight percent of the copolymer, and b is an integer such that the hydrophobe represented by ($C_3H_6O$) has a molecular weight from about 1000 to about 2150, preferably from about 1200 to about 2100, and most preferably from about 1750 to about 2050. The total molecular weight of the copolymers of use in the invention should be such that the block copolymer is in liquid form and water soluble.

The amount of the polyoxyethylene polyoxypropylene block copolymers in the acid gas scrubbing solution is not critical in terms of defoaming activity. Typically, the antifoaming agent block copolymers will be present in an amount ranging from about 1 to about 1500 parts per million (ppm), preferably from about 5 to about 50 ppm per weight of the total acid gas scrubbing solution.

The hydrophobe of the polyoxyethylene polyoxypropylene block copolymers described herein may be prepared by adding propylene oxide to the two hydroxyl groups of a propylene glycol nucleus. By adding ethylene oxide to the hydrophobe, it is possible to place polyoxyethylene hydrophilic groups on both ends of the molecule. These hydrophilic polyoxyethylene groups may be controlled to constitute anywhere from about 10 to about 30 weight percent of the final molecule. A more detailed description of the preparation of these block copolymers may be found in U.S. Pat. No. 2,674,619, the disclosure of which is incorporated herein by reference. Alternatively, the polyoxyethylene polyoxypropylene block copolymers may be obtained commercially, e.g., they are presently available from BASF Wyandotte Corporation and identified as Pluronic (Registered Trademark) polyols L42, L43, L61, L62, L63 and L72.

The present invention is also directed to using the aforesaid acid gas scrubbing solution, which includes the polyoxyethylene polyoxypropylene block copolymers, in a process for removing $CO_2$ from gaseous feeds containing $CO_2$.

The term "acid gas" as used herein, includes $CO_2$ alone or in combination with $H_2S$, $SO_2$, $SO_3$, $CS_2$, HCN, COS and the oxides and sulfur derivatives of $C_1$ to $C_4$ hydrocarbons. The major constituents of the acid gas will be comprised of $CO_2$ and/or $H_2S$.

The term "hydrophobic moiety", which is part of the amine activator, is meant to include a moiety which itself is not wetted by water. Typical hydrophobic moieties include alkylene, alkyl, and substituted alkylene and alkyl groups having three or more carbon atoms. Also included are cycloalkyl groups having three or more carbon atoms.

DESCRIPTION OF THE PREFERRED EMBODIMENTS

The antifoaming agent comprising the polyoxyethylene polyoxypropylene block copolymers may be added separately or in combination with the acid gas scrubbing solution during the process of removing the acid gases from the gaseous streams. Preferably, the alkaline material will be an alkali metal salt or alkali metal hydroxide and most preferably an alkali metal salt such as potassium carbonate. The amine activator containing a hydrophobic moiety may be 1,6-hexanediamine, piperidine or their derivatives (as disclosed in U.S. Pat. Nos. 3,637,345; 3,793,434; and 3,848,057, the disclosures of which are incorporated herein by reference), sterically hindered amines, i.e., amines wherein at least one secondary amino group is attached to either a secondary or tertiary carbon atom or a primary amino group is attached to a tertiary carbon atom, especially preferred, the sterically hindered aminoethers, aminoalcohols, di- and triamines such as disclosed in U.S. Pat. No. 4,094,957 and U.S. Pat. No. 4,112,050, the disclosures of which are incorporated herein by reference, and other hydrophobic amine activators, coactivators and mixtures thereof.

The absorbing solution containing the block copolymer antifoaming agent of the invention will preferably be comprised of a major proportion of an alkaline material, e.g., alkali metal salt and a minor proportion of the amine activator. The salt content of the acid gas scrubbing solution will be in the range from about 10 to 40 weight percent, preferably 20 to 30 weight percent. The content of the amine activator, preferably a sterically hindered amine, in the solution will be in the range from about 2 to about 20 weight percent, preferably 5 to about 15 weight percent and more preferably 5 to about 10 weight percent. As a preferred embodiment, the amine activator will be comprised of a sterically hindered amine which may be used alone or in combination with other amines such as diethanolamine and/or aminoacid cosolvents for the sterically hindered amines as disclosed and claimed in U.S. Pat. No. 4,094,957. The aminoacid cosolvent will include those aminoacids having 4 to 8 carbon atoms which increase the solubility of sterically hindered amines in alkaline aqueous conditions at elevated temperatures, e.g., N,N-dimethylglycine, 3-amino-3-methyl butyric acid, 2-amino-2-methyl-butyric acid, and pipecolinic acid. The preferred sterically hindered amines include: the cycloaliphatic diamines such as N-cyclohexyl-1,2-ethanediamine, N-cyclohexyl-1,3-propane-diamine, N-cyclohexyl-1,4-butanediamine and N-cyclohexyl-1,5-pentanediamine; the piperazines such as 2-methylpiperazine and 2,5-dimethylpiperazine and the diamine, $N_1$(1,1-dimethyl-2-hydroxyethyl)-2-methyl-1,2-propanediamine. The most preferred sterically hindered amines are N-cyclohexyl-1,3-propanediamine and N-cyclohexyl-1,4-butanediamine. The most preferred cosolvent is pipecolinic acid.

Other additives in addition to the antifoaming agent of the invention can be included in the acid gas scrubbing solution, e.g., antioxidants, corrosion inhibitors, etc. Also, the acid gas scrubbing solution may contain mixtures of amines, e.g., the sterically hindered amines may be used in combination with diethanolamine. The antifoaming agent of the invention may be used in combination with other antifoaming agents.

The contacting of the absorbent mixture containing the antifoaming agent of the invention and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor. The antifoaming agent may be fed into the absorber alone or with the absorbent mixture and recycled as such.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psia, preferably 100 to 1500 psia, and most preferably 200 to 1000 psia in the absorber. In the desorber the pressures will range from about 5 to 100 psia. The partial pressure of the acid gas, e.g., $CO_2$ in the feed mixture, will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption the solution is preferably maintained in a single phase, e.g., by action of an aminoacid cosolvent in the event a relatively insoluble sterically hindered amine is used as the $K_2CO_3$ activator. The aminoacid cosolvent also aids in foam reduction.

The absorbing solution comprising the aqueous mixture containing the alkaline metal salt and preferably the sterically hindered amine and aminoacid which is saturated or partially saturated with gases, such as $CO_2$ and $H_2S$ may be regenerated so that it may be recycled back to the absorber. The regeneration should also take place in a single liquid phase. Therefore, the presence of an aminoacid cosolvent provides an advantage in this part of the overall acid gas scrubbing process. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step may be the same as used in the absorbing step, i.e., 25° to about 200° C. and preferably 35° to about 150° C. The absorbing solution, after being cleansed of at least a portion of the acid bodies, may be recycled back to the absorbing tower. Makeup absorbent may be added as needed. Single phase is maintained during desorption by controlling the acid gas, e.g., $CO_2$, level so that it does not fall into the region where two liquid phases form. This, of course, following the practice of the present invention is facilitated by the use of the aminoacid cosolvent in combination with the sterically hindered amine.

For example, during desorption, the $CO_2$-rich solution from the high pressure absorber is sent first to a flash chamber where steam and some $CO_2$ are flashed from solution at low pressure. The amount of $CO_2$ flashed off will, in general, be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to about 25 psia stripper pressures, the temperature will preferably be about 100° to about 140° C. during desorption. Single phase can be maintained during desorption by regulating the amount of acid gas, e.g., $CO_2$, recovered.

The gaseous mixture freed largely from acid gases emerging from the top of the absorber may then be further scrubbed in a caustic scrubber tower by countercurrent contact with aqueous alkali metal hydroxide, (e.g., an aqueous solution containing about 1–10% by weight NaOH). If foaming develops in the caustic scrubber, the polyoxyethylene polyoxypropylene block copolymer defoamer of the present invention may be added to the caustic solution to reduce foaming in the scrubber. The gases entering into the caustic scrubber may also contain residual amine activator, the presence of which may enhance foaming in the presence of the sodium hydroxide. Following caustic scrubbing, the gases may be passed countercurrently through water as a final cleanup.

The invention is illustrated further by the following examples which, however, are not to be taken as limiting in any respect. All parts and percentages, unless expressly stated to be otherwise, are by weight.

EXAMPLE 1

This example shows the defoaming effect of the polyoxyethylene polyoxypropylene block copolymers of the present invention as compared against other polyoxyethylene polyoxypropylene block copolymers.

(a) The following test is used to quickly determine potential candidate antifoaming agents in hydrophobe-containing amine-carbonate acid gas scrubbing solutions. A predetermined amount of a potential defoamer (up to 1000 ppm) is weighed into a 250 ml erlenmeyer flask containing 100 g. of N-cyclohexyl-1, 3-propanediamine (CHPD)-carbonate ($K_2CO_3$) solution (e.g., 7.4% CHPD, 6.1% pipecolinic acid and 25% $K_2CO_3$). A watchglass is placed on top of the flask (to keep down the evaporation), then the flask is stirred and heated to 80°–90° C. The stirring is stopped, and a stainless-steel sparger (60 mesh) through which about 1 liter/minute of nitrogen is flowing, is introduced into the solution. If foam is present in large quantities, the solution is discarded. If no foam or a slight foam appears and it persists as a low foam, this defoamer is then held for further testing as shown in section (b). The results of this screening test are shown in the following table.

TABLE 1

| Antifoam Block Copolymer (Pluronic TM polyol) Code Nos. | Mol. Wt. of Hydrophobe ($C_3H_6O$) (average) | Wt. % of Hydrophile ($C_2H_4O$) (average) | Results of Preliminary Screening Tests[a] |
| --- | --- | --- | --- |
| L31 | 950 | 10 | − |
| L42 | 1200 | 20 | ± |
| L43 | 1200 | 30 | + |
| L44 | 1200 | 40 | + |
| L61 | 1750 | 10 | + |
| L62 | 1750 | 20 | + |
| L63 | 1750 | 30 | + |
| L64 | 1750 | 40 | − |
| L72 | 2050 | 20 | + |
| L81 | 2250 | 10 | + |
| L92 | 2750 | 20 | + |
| L101 | 3250 | 10 | + |
| P84 | 2250 | 40 | + |
| P94 | 2750 | 40 | − |

TABLE 1-continued

| Antifoam Block Copolymer (Pluronic TM polyol) Code Nos. | Mol. Wt. of Hydrophobe (C$_3$H$_6$O) (average) | Wt. % of Hydrophile (C$_2$H$_4$O) (average) | Results of Preliminary Screening Tests[a] |
|---|---|---|---|
| P104 | 3250 | 40 | + |

[a] In each of the tests approximately 1000 ppm to 3000 ppm of the block copolymer is added to the test solution. The symbol − indicates the solution foamed and the block copolymer did not pass the initial screening test. The symbol + indicates the test solution did not foam and the block copolymer was selected for further screening as shown below. The symbol ± indicates the test solution foamed slightly.

(b) As a further screening of the antifoaming agents, the block copolymers which were indicated positive, +, in the preliminary screening tests are subjected to the following quantitative tests. Five hundred grams of the amine-carbonate solution (e.g., 7.4% CHPD, 6.1% pipecolinic acid and 25% K$_2$CO$_3$) is put into a cyclindrical graduated 4 liter jacketed gas trap apparatus. A circulating oil bath surrounds the cylinder to maintain the temperature of the unit at 80° C. A gas sparger is inserted through an adapter with a reflux condenser on the side arm to insure the integrity of the starting solution. The amine-carbonate solution put in the apparatus is then allowed to equilibrate at the 80° C. level. A calibrated flow (½ to 4 liters/min.) of nitrogen gas is introduced into the solution containing a designated amount of the candidate defoamer, and the foam is allowed to stabilize. The height of the foam is then measured from the base of the foam to the top. With this number recorded, the gas is then stopped abruptly and the foam allowed to settle and the time required is measured. The foam height can be plotted as a function of gas rate.

The steps above are repeated with increasing amounts of defoamer. The results of this screening test are shown in Table II.

TABLE II

| Antifoam (Pluronic TM Polyol Code Nos.) | Amount of Antifoam, ppm | Foam Height, ml Gas Rate, Liters/min. | | | |
|---|---|---|---|---|---|
| | | 1 | 2 | 3 | 4 |
| Control | — | 150 | 500 | 900 | 1800 |
| L42 | 10 | 250 | 950 | 1300 | 1300 |
| L42 | 20 | 350 | 1050 | 1300 | 1350 |
| L42 | 50 | 200 | 450 | 600 | 700 |
| L42 | 100 | 200 | 300 | 400 | 500 |
| L42 | 1000 | 150 | 200 | 150 | 200 |
| L42 | 1500 | 25 | 50 | 50 | 25 |
| L43 | 10 | 350 | 700 | 1100 | 1500 |
| L43 | 20 | 300 | 650 | 950 | 1200 |
| L43 | 50 | 250 | 400 | 550 | 600 |
| L43 | 100 | 100 | 200 | 200 | 200 |
| L43 | 200 | 30 | 60 | 60 | 90 |
| L44 | 10 | 600 | 1600 | 2000 | 2100 |
| L44 | 20 | 350 | 1400 | 1400 | 1700 |
| L44 | 50 | 50 | 200 | 300 | 450 |
| L44 | 100 | 50 | 200 | 300 | 500 |
| L61 | 10 | 500 | 900 | 900 | 1000 |
| L61 | 20 | 500 | 800 | 900 | 1000 |
| L61 | 50 | 500 | 800 | 800 | 900 |
| L61 | 100 | 500 | 800 | 800 | 800 |
| L61 | 1000 | 500 | 750 | 750 | 700 |
| L61 | 1500 | 400 | 700 | 700 | 700 |
| L62 | 10 | 250 | 650 | 800 | 700 |
| L62 | 20 | 350 | 550 | 650 | 700 |
| L62 | 50 | 200 | 450 | 550 | 600 |
| L62 | 100 | 200 | 450 | 650 | 550 |
| L62 | 1000 | 150 | 400 | 450 | 450 |
| L62 | 1500 | 100 | 350 | 400 | 350 |
| L63 | 10 | 100 | 350 | 300 | 450 |
| L63 | 20 | 50 | 300 | 450 | 500 |
| L63 | 50 | 50 | 250 | 300 | 300 |
| L63 | 100 | 50 | 200 | 200 | 200 |
| L72 | 10 | 300 | 400 | 500 | 550 |
| L72 | 20 | 200 | 400 | 400 | 500 |
| L72 | 50 | 150 | 350 | 400 | 450 |
| L72 | 100 | 150 | 350 | 400 | 450 |
| L72 | 1000 | 150 | 300 | 300 | 300 |
| L72 | 1500 | 125 | 200 | 300 | 300 |
| L81 | 1500 | 340 | 210 | 20 | 340 (charred) |
| Control | — | 150 | 500 | 900 | 1800 |
| L92 | 10 | 300 | 900 | 900 | 1000 |
| L92 | 20 | 450 | 900 | — | — |
| L92 | 50 | 400 | 800 | — | — |
| L92 | 100 | No change | | | |
| L101 | 10 | 450 | 800 | 900 | 1000 |
| L101 | 20 | 450 | 900 | 1000 | 1000 |
| L101 | 50 | 450 | 900 | 1000 | 1000 |
| L101 | 100 | 450 | 900 | 1000 | 1000 |
| L101 | 1000 | 250 | 750 | 750 | 800 |
| L101 | 1500 | 200 | 500 | 650 | 700 |
| P84 | 10 | 300 | 800 | 1100 | 1350 |
| P84 | 20 | 400 | 900 | 1100 | 1400 |
| P84 | 50 | 300 | 900 | 1000 | 1250 |
| P84 | 100 | 350 | 800 | 1100 | 1300 |
| P104 | 10 | 350 | 850 | (Defoamer charred) Experiment Aborted) | |

Based on the tests shown in Table II, the antifoam block copolymers identified as Pluronic TM polyol L81, L92, L101, P84, and P104 are deemed inferior to Pluronic TM polyol L42, L43, L61, L62, L63 and L72. The latter block copolymers were able to reduce the foam height by at least a half the level of the control sample at a gas flow rate of 4L/min when 100 ppm of the antifoamer is added to the acid gas scrubbing solution.

(c) An important aspect of a good antifoaming agent for use in acid gas scrubbing processes is its ability to retain its integrity during prolonged use. Two of the block copolymers, Pluronic TM polyol L42 and L72 are tested for their ability to retain their integrity by adding the block copolymer to a CHPD/pipecolinic acid/K$_2$CO$_3$ acid gas scrubbing solution (e.g., 7.4% CHPD, 6.1% pipecolinic acid and 25% K$_2$CO$_3$). The acid gas scrubbing solution containing the antifoaming agent is placed in a double ended 500 ml stainless steel cylindrical bomb. One end of the bomb is capped with a swagelock fitting, and the acid gas scrubbing solution with added antifoaming agent is poured in the other end. The open end of the bomb is then sealed with a 2000 Kpc safety, and the entire bomb is placed in a 120° C. oven and allowed to remain there for a 500-hour period. The solution is removed, cooled, and put into the gas sparging apparatus described in 1(b) above. The results of this test are shown in Table III.

TABLE III

| Antifoam Block Copolymer (Pluronic TM polyol Code Nos.) | Amount of Antifoam, ppm | Foam Height, ml Gas Rate, Liters/min | | | |
|---|---|---|---|---|---|
| | | 1 | 2 | 3 | 4 |
| L42 | 100 | 150 | 230 | 300 | 400 |
| L72 | 50 | 30 | 150 | 150 | 200 |

The results in Table III show that the polyoxyethylene polyoxypropylene block copolymers having 20 weight percent of the hydrophile in the copolymer and having a hydrophobe having an average molecular weight of about 1200 to about 2050 are able to withstand rather a severe aging test and retain their ability to act as a defoamer for the foam producing amine-carbonate acid gas scrubbing solution. The aging test can be repeated for additional 500-hour sequences a number of times to ascertain the durability of antifoamers.

EXAMPLE 2

An add-on test is simulated wherein a small amount of N-cyclohexyl-1,3-propanediamine (CHPD) and co-solvent, pipecolinic acid are added to a diethanolamine (DEA) acid gas scrubbing solution. In one experiment there is no antifoaming agent present (except for the antifoaming action of the DEA), and in the other 10 ppm of Pluronic TM polyol L72 is added. Each of the respective acid gas scrubbing solutions are placed in the apparatus described in Example 1(b) above. A calibrated flow ($\frac{1}{2}$ to 4 liters/minute) of nitrogen gas is introduced into the solution, and the foam is allowed to stabilize. The height of the foam is then measured from the base of the foam to the top. With this number recorded the gas is then stopped abruptly, and the foam is allowed to settle, and the time required is measured. The acid gas scrubbing solution (Solution A) without the antifoaming agent has the following composition:

| Acid Gas Scrubbing Solution A | |
|---|---|
| 31.5 g. | diethanolamine (DEA) |
| 187.5 g. | $K_2CO_3$ |
| 36.9 g. | $H_3BO_3$ |
| 3.7 g. | CHPD |
| 1.8 g. | pipecolinic acid |
| 480.0 g. | water |

The test solution containing the antifoaming agent solution is the same as described above except that it contains 10 ppm of the Pluronic TM polyol L72, the most preferred nonionic antifoaming agent for the CHPD amine $K_2CO_3$ activator. The results of the tests using the above described acid gas scrubbing solutions are shown below.

TABLE IV

| Acid Gas Scrubbing Solution Tested | Foam Height, ml Gas Rate, Liters/min | | | | |
|---|---|---|---|---|---|
| | 0.5 | 1 | 2 | 3 | 4 |
| Solution A (no antifoam) | 10 | 100 | 350 | 500 | 700 |
| Solution B (10 ppm Pluronic TM polyol L72) | 10 | 50 | 100 | 125 | 125 |

The results in Table IV show that the antifoaming agent of the invention considerably reduces the foam in the acid gas scrubbing solution.

EXAMPLE 3

An example of the process of removing $CO_2$ from a gaseous stream containing $CO_2$ using an amine activated potassium carbonate solution with an antifoaming agent of the present invention is carried out in a gas treating unit described below. The gas treating unit includes an absorber, a regenerator, a flash drum situated and connected between the absorber and the regenerator and a reboiler which is connected downstream to the regenerator. The absorber is a cyclindrical vessel having an inside nominal diameter of about 6 inches, and the regenerator is a cylindrical vessel having an inside nominal diameter of about 8 inches. Both of the vessels contain ⅜" stainless steel pall rings and have a bed height of about 5 feet.

The acid gas treating unit is operated by continuously feeding a typical gaseous feed (i.e., a gas containing $N_2$, $H_2$, $CO_2$, $H_2S$, and may contain a trace of $CH_4$) into the side of the lower portion of the absorber at the rate of 107-116 standard cubic feet per minute (SCF/M). The gaseous feed typically contains 13-15 mole % $CO_2$ and about 0.5 to 0.6 mole % $H_2S$. The acid gas scrubbing solution (e.g., the solution is comprised of 30 weight % $K_2CO_3$, 7.4 weight % N-cyclohexyl-1,3-propanediamine and 3.0 weight % pipecolinic acid) is fed into the side of the top portion of the absorber at a continuous circulation rate ranging from about 2.5 to about 4 gallons per minute. The absorber is maintained at a temperature ranging from about 199° F.–205° F. and at a pressure ranging from about 190–195 psia. The treated gas exits the top of the absorber and typically contains (in the test examples) 3.4–5.6 mole % $CO_2$ and less than 400 parts per million $H_2S$. The $CO_2$ rich spent acid gas scrubbing solution exits the bottom of the absorber and is fed to the flash drum by a transport pipe which includes a steam source. The $CO_2$ rich solution is freed of some of the acid gases in the flash drum. The gases exiting the flash drum are combined with the gases leaving the regenerator by suitable transport lines. Means are provided to analyze the $CO_2$ gas from these transport lines. The partially regenerated acid gas scrubbing solution is continuously fed into the side of the top portion of the regenerator at a rate of about 2.5 to about 4 gallons per minute.

Steam is fed into the side of the lower portion of the regenerator to effect countercurrent contact with the down flowing solution. The acid gases are carried out the top of the regenerator and combined by a common conduit with the acid gases vented from the flash drum. The regenerator is maintained at a temperature ranging from about 235°–245° F. and at pressures ranging from about 5–15 psia (preferably at atmospheric pressures). The $CO_2$ lean acid gas scrubbing solution exits the bottom of the regenerator by a transport line to a reboiler operating at a steam rate of about 176 pounds/hour. Used steam from the reboiler is passed into the lower portion of the regenerator by a suitable transport conduit to aid in the heat balance of the overall system. This steam may carry a portion of the lean acid gas scrubbing solution to the regenerator. The regenerated acid gas scrubbing solution is then recycled to the top portion of the absorber by a transport line with heat exchanger means to adjust the temperature of the solution (i.e., cold water may be used to cool the solution, whereas added steam may be used to elevate the temperature of the solution). During operation the entire system is kept in balance. As the chemical absorbents, e.g., $K_2CO_3$, CHPD and pipecolinic acid are depleted, fresh chemicals can be added as needed to maintain a constant level of absorption.

In one experimental run (Run No. 1832) using the gas treating unit described above, a gaseous feed containing 13.8 mole % $CO_2$ is fed into the absorber at a feed rate of 107 SCF/M while the above described acid gas absorbing solution is fed counter-currently at a continuous circulation rate of 2.49 GPM. The gas leaving the top of the absorber contains 3.7 mole % $CO_2$. Steam is fed into the regenerator at the rate of 1.40 pounds per gallon. The lean conversion is determined as 0.209 ($CO_2$), and the amount of $CO_2$ absorbed is 11.3 SCF/M. The pressure drop in the absorber is 1.55 inches of water (theoretical is 0.82 inches of water). The pressure drop in the regenerator is 4.13 inches of water (theoretical is 2.30). Considerable foam appeared in the regenerator, and some foam appeared in the absorber.

The above experiment was repeated a number of times using the same acid gas absorbing solution with the addition of 5 parts per million of Pluronic TM polyol L72 to control the foam. The addition of the antifoaming agent of the invention reduced the foam considerably and permitted the circulation rate of the acid gas scrubbing solution to increase from 2.49 GPM to 3.56 GPM (Run No. 1834). Of particular significance, the pressure drop in the regenerator is reduced from 4.13 inches of water (in the case of no antifoaming agent) to a level of 1.05 inches of water (Run No. 1834) in the case where 5 ppm of the antifoaming agent is added.

In full scale plant operations there is often a caustic scrubber connected to the top of the absorber which is used to remove the last traces of acid gases. The caustic scrubber also functions as a trap for any amines that are carried into the conduit leading to the scrubber by the treated gas. It has been found that when the amine activator, e.g., CHPD, is carried into the caustic scrubber by the treated gas or otherwise (e.g., volatilization) the antifoaming agent of the invention (particularly Pluronic TM polyol L72) is effective in reducing or eliminating the foam in this unit.

While the invention has been described in connection with specific embodiments thereof, it will be understood that it is capable of further modification, and this application is intended to cover any variations, uses, or adaptations of the invention following, in general, the principles of the invention and including such departures from the present disclosure as coming within known or customary practice in the art to which the invention pertains and as may be applied to the essential features hereinbefore set forth, and as falling within the scope of the invention.

What is claimed is:

1. An acid gas scrubbing composition composition having a reduced tendency to foam comprising:
   (a) an alkaline material comprising a basic alkali metal salt or alkali metal hydroxide,
   (b) one or more amino compounds at least one of which contains a hydrophobic moiety,
   (c) water, and
   (d) from about 1 to about 1500 parts per million by weight of said composition of at least one antifoaming agent comprising a polyoxyethylene polyoxypropylene block copolymer of the general formula:

$$HO(C_2H_4O)_a(C_3H_6O)_b(C_2H_4O)_cH$$

wherein a and c are integers such that the hydrophile portion represented by $(C_2H_4O)$ constitutes from about 10 to about 30 weight percent of the block copolymer and b is an integer such that the hydrophobe represented by $(C_3H_6O)$ has a molecular weight from about 1000 to about 2150.

2. The composition of claim 1 wherein a and c of said block copolymers are integers such that the hydrophile portion represented by $(C_2H_4O)$ constitutes from about 15 to about 25 weight percent of the block copolymer and b is an integer such that the hydrophobe represented by $(C_3H_6O)$ has a molecular weight ranging from about 1200 to about 2100.

3. The composition of claim 2 wherein b of the block copolymer is such that the hydrophobe portion represented by $(C_3H_6O)$ has a molecular weight ranging from about 1750 to about 2050.

4. The composition of claim 1 wherein at least one of the amino compounds is a sterically hindered amine defined as a compound containing at least one secondary amine group attached to either a secondary or tertiary carbon atom or a primary amino group attached to a tertiary carbon atom.

5. The composition of claim 4 wherein the sterically hindered amine is selected from the group consisting of aminoethers, aminoalcohols, di- and triamines.

6. The composition of claim 4 wherein the sterically hindered amine is a diamine.

7. The composition of claim 6 wherein the diamine is a cycloaliphatic diamine.

8. The composition of claim 6 wherein the diamine is selected from the group consisting of N-cyclohexyl-1,2-ethanediamine, N-cyclohexyl-1,3-propanediamine, N-cyclohexyl-1,4-butanediamine and N-cyclohexyl-1,5-pentane diamine.

9. The composition of claim 1 wherein the alkaline material is potassium carbonate.

* * * * *